United States Patent
Marchesano et al.

(10) Patent No.: US 9,150,255 B2
(45) Date of Patent: Oct. 6, 2015

(54) LOAD BEARING PANEL ASSEMBLY

(71) Applicant: Century Plastics, Inc., Shelby Township, MI (US)

(72) Inventors: Joseph W. Marchesano, Macomb, MI (US); Calvin A. Saur, West Bloomfield, MI (US)

(73) Assignee: Century Plastics, Inc., Shelby Township, MI (US)

( * ) Notice: Subject to any disclaimer, the term of this patent is extended or adjusted under 35 U.S.C. 154(b) by 0 days.

(21) Appl. No.: 14/075,367

(22) Filed: Nov. 8, 2013

(65) Prior Publication Data

US 2014/0062137 A1   Mar. 6, 2014

Related U.S. Application Data

(62) Division of application No. 13/755,558, filed on Jan. 31, 2013, now Pat. No. 8,690,228.

(60) Provisional application No. 61/619,592, filed on Apr. 3, 2012.

(51) Int. Cl.

| | |
|---|---|
| *B60R 7/04* | (2006.01) |
| *B62D 25/00* | (2006.01) |
| *B62D 25/02* | (2006.01) |
| *E04B 2/00* | (2006.01) |
| *B60R 13/01* | (2006.01) |
| *B62D 65/02* | (2006.01) |
| *E04C 2/38* | (2006.01) |

(52) U.S. Cl.
CPC ............... *B62D 25/00* (2013.01); *B60R 13/01* (2013.01); *B62D 25/02* (2013.01); *B62D 65/02* (2013.01); *E04C 2/38* (2013.01); *E04C 2/44* (2013.01); *Y10T 156/1002* (2015.01)

(58) Field of Classification Search
CPC ...... B62D 25/00; B62D 25/087; B62D 65/02; B60R 7/04; E04C 2/38
USPC ............... 296/191, 186.1, 184.1, 37.3, 37.14, 296/37.16, 29; 52/479, 773, 781.3, 783.11, 52/783.14, 783.17–783.19, 797.1; 293/102, 120–122
See application file for complete search history.

(56) References Cited

U.S. PATENT DOCUMENTS

| | | | | |
|---|---|---|---|---|
| 4,047,703 A | * | 9/1977 | Murdock | ......................... 256/68 |
| 4,440,434 A | * | 4/1984 | Celli | .......................... 296/181.2 |

(Continued)

FOREIGN PATENT DOCUMENTS

JP          4-55175          *  2/1992  ............. B62D 25/10

*Primary Examiner* — Dennis H Pedder
(74) *Attorney, Agent, or Firm* — Quinn Law Group, PLLC

(57) ABSTRACT

A panel assembly includes at least one reinforcing assembly made of a high strength material having a low yield to tensile strength ratio for energy absorption and reduced weight and profile. The panel assembly may be light-weight with a low profile to minimize protrusion into an opening or compartment enclosed by the panel. The panel assembly may be a floor panel assembly for a vehicle floor. The reinforcing assembly may traverse the panel such that the reinforcing assembly extends laterally, e.g., cross-vehicle, relative to the longitudinal axis of the vehicle body. A method of making the panel assembly may include forming the reinforcing assembly by joining a plurality of metal channel members in a nested arrangement with a plurality of welds to provide a structural assembly with good bending resistance loads imposed on the panel assembly including knee loads. The channel members may be made of a dual phase steel.

18 Claims, 3 Drawing Sheets

(56) References Cited

U.S. PATENT DOCUMENTS

| | | | | |
|---|---|---|---|---|
| 4,719,689 | A * | 1/1988 | Yamamoto et al. | 29/458 |
| 4,966,082 | A * | 10/1990 | Takeichi et al. | 105/422 |
| 5,586,661 | A * | 12/1996 | Maki | 209/397 |
| 6,193,306 | B1 * | 2/2001 | Lee | 296/209 |
| 6,217,102 | B1 * | 4/2001 | Lathers | 296/100.07 |
| 6,237,304 | B1 * | 5/2001 | Wycech | 52/847 |
| 6,341,467 | B1 * | 1/2002 | Wycech | 52/834 |
| 6,679,540 | B1 * | 1/2004 | Graber et al. | 296/146.6 |
| 8,215,693 | B2 * | 7/2012 | Ulita | 296/37.1 |
| 2005/0161965 | A1 * | 7/2005 | Eberlein | 296/29 |
| 2005/0175828 | A1 * | 8/2005 | Bradish | 428/292.1 |
| 2006/0266000 | A1 * | 11/2006 | Morris et al. | 52/783.11 |
| 2008/0184760 | A1 * | 8/2008 | Carsley et al. | 72/306 |
| 2009/0096234 | A1 * | 4/2009 | Pauken et al. | 296/1.03 |
| 2009/0133354 | A1 * | 5/2009 | Spear et al. | 52/588.1 |
| 2010/0186345 | A1 * | 7/2010 | Hughes, Jr. | 52/783.17 |
| 2011/0248528 | A1 * | 10/2011 | Huth et al. | 296/214 |
| 2012/0217769 | A1 * | 8/2012 | Hustyi et al. | 296/191 |

* cited by examiner

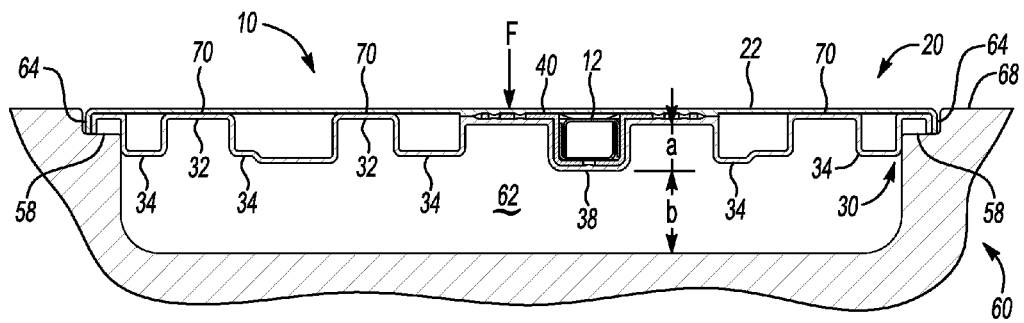
*Fig-3*
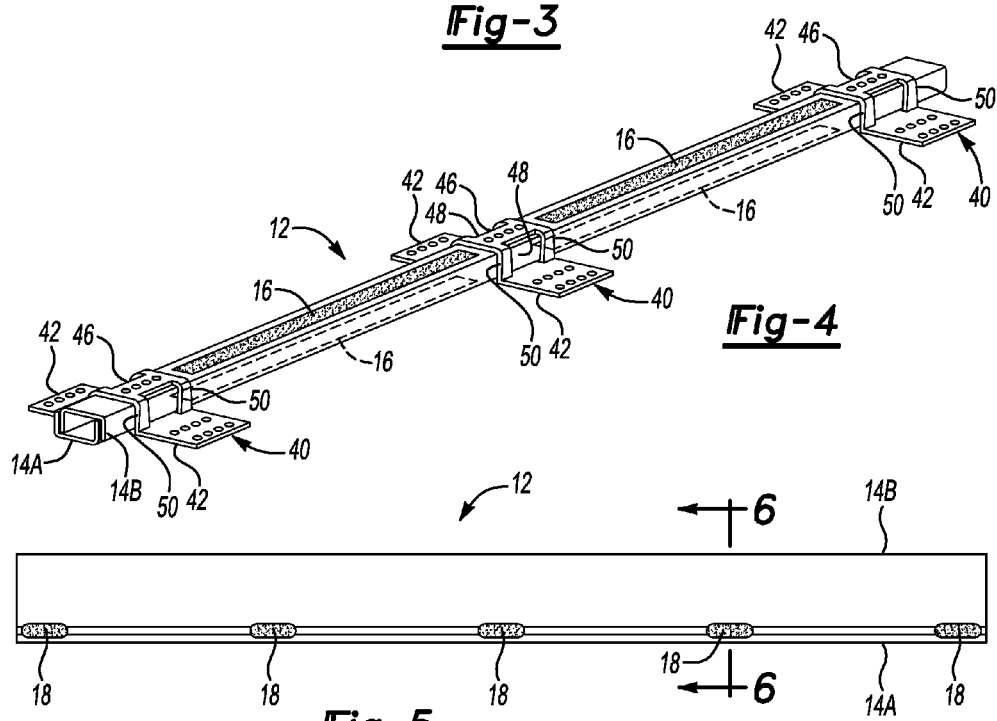
*Fig-4*
*Fig-5*
*Fig-6*

LOAD BEARING PANEL ASSEMBLY

CROSS-REFERENCE TO RELATED APPLICATION

This application claims the benefit of U.S. application Ser. No. 13/755,558 filed Jan. 31, 2013, and U.S. Provisional Application No. 61/619,592 filed Apr. 3, 2012, which are hereby incorporated by reference in their entirety.

TECHNICAL FIELD

The present invention relates generally to a load bearing panel assembly.

BACKGROUND

A panel assembly may be used to enclose a structure which may define an opening or compartment which is to be covered by the panel. The panel may be configured to withstand a force or load imposed on the panel without failing and/or exceeding a maximum deflection. Panel assemblies are used in vehicles to enclose various structures. For example, door panels configured to withstand bending and deflection forces are used to enclose door structures. In another example, a floor panel may be positioned in a floor, trunk, storage, or cargo space of a vehicle to enclose a compartment used to enclose or store one or more vehicle components, such as a spare tire or vehicle jack, or other vehicle user items, such as luggage, tools, etc. The floor panel should be configured to withstand bending and deflection forces and loads imposed by items which may be placed on the floor panel, which may include vehicle users standing, sitting or kneeling on the floor panel. A floor panel may be used in a vehicle including one or more retractable seats, where the floor panel is configured to cover the seat(s) when the seat(s) are fully retracted into a compartment defined by the floor structure of the vehicle. In this configuration, the panel should be configured to withstand loading and deflection forces imposed on the panel when the seats are in the retracted position, which may include withstanding a minimum knee loading requirement. Panels of non-reinforced twin sheet construction may not resist loading forces or may warp or distort in high temperature operating environments. Floor panels strengthened by adding a matrix or grid of reinforcing materials, and/or by increasing the depth of the panel profile or the thickness of the panel are disadvantaged by volume and weight added to the floor panel, such that the panel assembly presents a weight penalty to the vehicle and/or may be difficult to manipulate by a user, and/or the thick panel structure extends substantially into the vehicle compartment being enclosed to consume a portion of the compartment space, thus limiting the open compartment space available for storage, for example, of the retracted seat(s).

SUMMARY

A panel assembly and method for making the panel assembly is provided herein. The panel assembly described herein includes at least one reinforcing assembly which is made of a high strength material having a low yield to tensile strength ratio for good energy absorption and a reduced weight and thin profile, such that the panel assembly may be configured with light weight and a low profile to minimize protrusion of the panel structure into an opening or compartment enclosed by the panel. The panel assembly, in a non-limiting example, is configured as a floor panel assembly for a vehicle floor, and includes a reinforcing assembly configured to traverse the panel such that the reinforcing assembly extends laterally, e.g., cross-vehicle, relative to the longitudinal, e.g., front-to-back or fore-to-aft, axis of the vehicle body. The reinforcing assembly may be made of a plurality of metal channel members, which may be made of a dual phase steel, for example DIN HCT780X, and joined in a nested arrangement by a plurality of welds to provide a structural assembly with good bending resistance to knee loads and other loads imposed on the panel assembly. The panel assembly may be configured to enclose an opening in the vehicle floor, which may be an opening to a compartment defined by the vehicle structure. In one example, the panel assembly may be configured to enclose a compartment into which one or more vehicle seats may be retracted.

The panel structure may include an inner panel and an outer panel which are fixedly attached. In one example, the inner and outer panels may be joined by compression molding. The reinforcing assembly may be interposed between the inner and outer panels and retained in position by a plurality of brackets, wherein each bracket is operatively attached to the inner and outer panel and configured to retain the reinforcing assembly relative to the inner and outer panels in an anti-rattle configuration. Adhesive foam tape may be interposed between the reinforcing assembly and at least one of the inner and outer panels to provide a bond between the reinforcing assembly and the inner and/or outer panel and/or to stabilize the position of the reinforcing assembly relative to the inner and/or outer panel. The reinforcing assembly, brackets, adhesive tape and method of assembly to form the panel assembly may be configured to substantially minimize and/or eliminate noise generated by or movement of the reinforcing assembly relative to the panel, e.g., to substantially minimize and/or eliminate noise or movement which may be characterized as "buzz, squeak, rattle" (BSR) or which may be considered detrimental to the "noise, vibration and harshness" (NVH) performance of the vehicle, as those terms are commonly understood by one skilled in vehicle manufacture and assembly. The configuration of the reinforcing assembly and brackets enable the panel assembly to be configured as a low profile panel to minimize protrusion of the panel assembly structure into the opening and/or compartment enclosed by the panel assembly, to maximize usable compartment space and storage volume.

The above features and other features and advantages of the present teachings are readily apparent from the following detailed description of the best modes for carrying out the present teachings when taken in connection with the accompanying drawings.

BRIEF DESCRIPTION OF THE DRAWINGS

FIG. 3 is a fragmentary cross-sectional view of section 3-3 of the panel assembly of FIGS. 1 and 2;

FIG. 4 is a schematic perspective view of a reinforcing assembly and brackets of the panel assembly of FIGS. 1 and 2;

FIG. 5 is a top view of the reinforcing assembly of FIG. 4;

FIG. 6 is a cross-sectional view of section 6-6 of the reinforcing assembly of FIG. 5;

DETAILED DESCRIPTION

Figure 1:
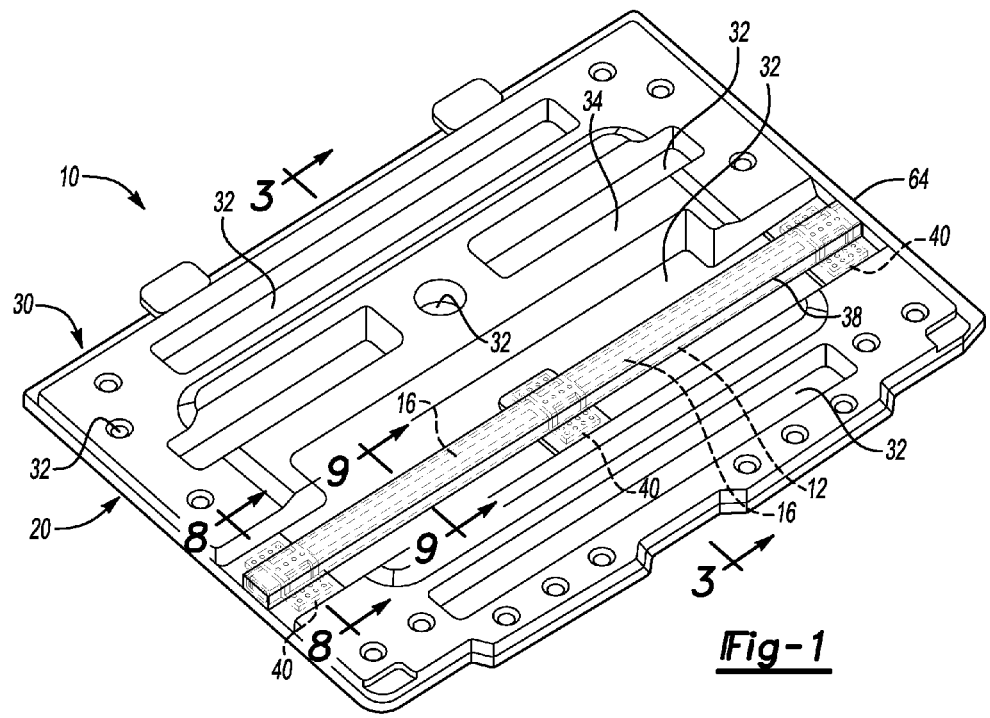
FIG. 1 is a schematic perspective view of an inner side of a panel assembly.
Figure 2:
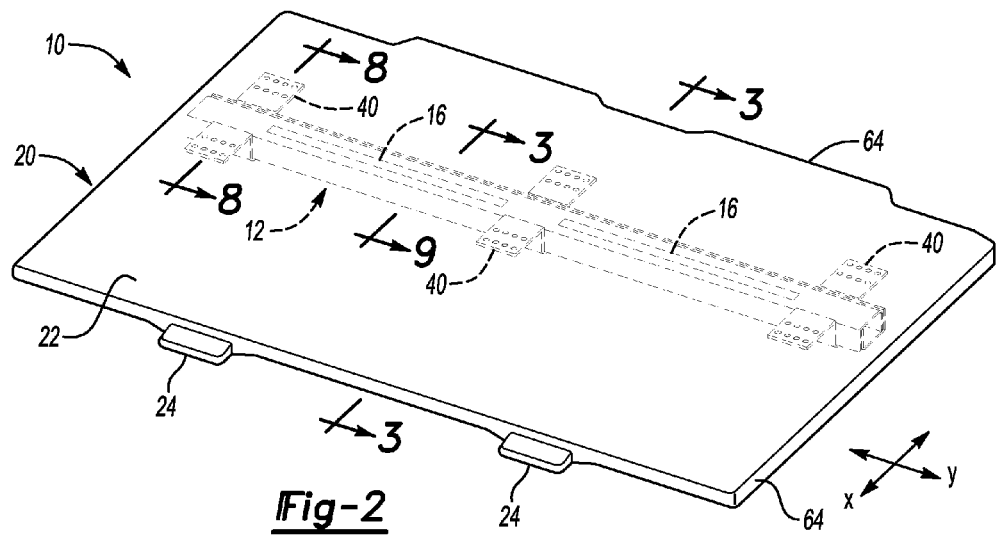
FIG. 2 is a schematic perspective view of an outer side of the panel assembly of FIG. 1.

Referring to the drawings wherein like reference numbers represent like components throughout the several figures, the elements shown in FIGS. 1-9 are not necessarily to scale or proportion. Accordingly, the particular dimensions and applications provided in the drawings presented herein are not to be considered limiting. Referring to FIGS. 1 and 2, generally indicated at 10 is a load bearing panel assembly including a first panel generally indicated at 20 and a second panel generally indicated at 30. The first panel 20 may be configured as an outer panel or appearance panel, such that when the panel assembly 10 is in an installed position, the first panel 20 is outwardly facing relative to an opening or compartment enclosed by the panel assembly 10. The second panel 30 may be configured as an inner panel or support panel, such that when the panel assembly 10 is in an installed position, the second panel 30 is inwardly facing relative to an opening or compartment enclosed by the panel assembly 10. The first and second panels 20, 30 may be joined to form the panel assembly 10 using a twin sheet compression molding or similar thermoforming process, which may include vacuum forming and/or blow molding of the panel assembly 10 and/or the first and second panels 20, 30.

The panel assembly 10 includes a reinforcing assembly 12 which is interposed between the first and second panels 20, 30, and retained in position relative to the panel assembly 10 by a plurality of brackets 40. Referring to FIG. 3, in a non-limiting example the panel assembly 10 may be configured as a vehicle floor panel which may be positioned in a floor, trunk, or storage or cargo space of a vehicle 60 to enclose a compartment 62 defined by the vehicle 60. The compartment 62 may be configured to house, enclose, store, or provide access to one or more vehicle components, such as a spare tire, vehicle jack, battery, electrical wiring, vehicle frame or structural component, etc., or to enclose or store other vehicle user items, such as luggage, tools, etc. The panel assembly 10 may be removable or repositionable to access the compartment 62. The panel assembly 10 is configured to withstand a bending and deflection force F (see FIG. 3) which may be imposed by items which may be placed on the panel assembly 10, which may include a vehicle user standing, sitting or kneeling on the panel assembly 10.

In the illustrative example shown in FIGS. 1-3, the panel assembly 10 may be used in a vehicle 60 including one or more retractable seats (not shown), where the panel assembly 10 is configured to cover the seat(s) when the seat(s) are fully retracted into the compartment 62 defined by the floor structure of the vehicle 60. The vehicle 60 may define a panel interface 58, which in the example shown may be configured as a recessed ledge around the perimeter of the compartment 62 to receive the panel assembly 10 to enclose the compartment 62, and may also be referred to herein as a perimeter ledge. The panel assembly 10 may include a compartment interface 64, which may be configured as a perimeter section or lip configured to generally conform to the perimeter ledge 58. The compartment interface 64 may be configured as a perimeter lip such that when the panel 10 is in the installed position in the vehicle 60 as shown in FIG. 3, the outer panel 20 is generally flush with the floor 68 of the vehicle 60 with the appearance surface 22 of the outer panel 20 facing outward relative to the compartment 62, and the inner panel 30 extending into the compartment 62 to a profile depth a, such that the compartment 62 has a usable volume characterized by a compartment depth b. In the illustrative example, the compartment depth b is sufficient to allow storage of a retractable seat in a retracted position in the compartment 62.

The panel assembly 10 includes a reinforcing assembly 12 interposed between the outer and inner panels 20, 30 such that the panel assembly 10 including the reinforcing assembly 12 is configured to withstand loading and deflection or bending forces generally indicated at F which may be imposed on the panel assembly 10 when the seats are in the retracted position and the panel assembly 10 is supported by the perimeter ledge 58 such that the panel assembly 10 encloses the compartment 62. The bending force F which must be withstood by the panel assembly 10 may be expressed as a minimum knee loading requirement. In one example, a minimum knee loading requirement for a vehicle floor panel, such as the panel assembly 10, may be the ability to withstand a point load F of 225 pounds such that deflection of the panel assembly 10 in the direction of the point load does not exceed 15 mm during loading, and permanent deflection of the panel after loading to 225 pounds does not exceed 5 mm. As will be described in further detail, the reinforcing assembly 12 is positioned relative to the panel assembly 10 using one or more brackets 40, retained between the panels 20, 30 and enclosed within a reinforced rib 38 defined by the inner panel 30 during the forming of the panel assembly 10.

Referring again to FIGS. 1 and 2, the panel assembly 10 may include one or more extensions 24 which may be configured for one or more uses. For example, an extension 24 may include a fastener, such as a hinge, pin or U-bolt, for movably attaching the panel assembly 10 to the vehicle 60 or floor 68. An extension 24 may be configured as a handle for lifting or moving the panel assembly 10 to access the compartment 62, for example, during stowage of a retractable seat (not shown) into the compartment 62, or retrieval of the stowed seat therefrom. The panel assembly 10 may include one or more other elements (not shown) which may include, for example, handles, latches, hold-down straps, d-rings, fasteners and/or trim components.

In the installed position in the vehicle, the outer panel 20 is outwardly facing so as to be viewable by a vehicle user. The outer panel 20 may be made of a polypropylene-based material, a scrim reinforced polyethylene, or other moldable or compression formable material. The material comprising the outer panel 20 may include a reinforcing fiber, which may be scrim, a natural fiber such as a wood fiber, or other reinforcing element. The outer panel 20 may be characterized by an appearance surface 22, which may be defined by or attached to the outer panel 20. The appearance surface 22 may be configured to match or complement other appearance surfaces of the vehicle 60, including, for example, the floor 68. The appearance surface 22 may include, for example, a carpet or other textile material, which may be tufted or woven, a vinyl, thermoplastic olefin, or other polymeric material, which may be textured, coated or otherwise treated or processed to provide the appearance surface 22. The appearance surface 22 may be configured to meet the requirements of a class "A" surface, e.g., an appearance surface which is viewable by the vehicle user during ordinary vehicle use.

The inner panel 30 may be made of a polypropylene-based material, a scrim reinforced polyethylene, or other moldable or compression formable material. The material comprising the inner panel 30 may include a reinforcing fiber, which may be scrim, a natural fiber such as a wood fiber, or other reinforcing element. The inner panel 30 may include a plurality of protrusions 34 and a plurality of recesses 32 which may be arranged to support, strengthen and/or stiffen the panel assembly 10, and/or define the profile of the inner panel 30. The plurality of recesses 32 may be configured to define a plurality of bonded interfaces 70. The configuration of the protrusions 34 may vary, and may include one or more elongated ribs oriented generally parallel to one or more of the x- and y-directions (see FIG. 2), or skewed (not shown) to one or more of the x- and y-directions. Two or more of the protrusions 34 may bisect each other in an orthogonal and/or non-orthogonal arrangement. The plurality of protrusions 34 may be arranged to provide one or more recesses 32. A recess 32 may be configured to generally conform to or receive an item stored in the compartment 62. For example, the plurality of protrusions 34 may provide a recess 32 configured to conform to a retracted seat stowed in the compartment 62 (not shown), to optimize the storage capacity of the compartment 62 in combination with the panel assembly 10. The protrusions 34 may be solid or partially filled (not shown), or, as shown in the illustrative example of FIG. 3, may be configured as hollow ribs or protrusions to reduce the weight of the panel assembly 10 in comparison with a similar structure formed with solid or partially filled ribs.

The protrusions 34 may be configured to define a "low profile panel assembly" 10, wherein a "low profile panel assembly" is a panel assembly 10 configured to minimize the profile depth a (see FIG. 3) to which the panel assembly extends into the compartment 62 being enclosed by the panel assembly 10, while meeting the functional requirements, including the bending load and deflection resistance, to which the panel assembly 10 is subject. In one example, the protrusions 34 and the reinforced rib 38 including the reinforcing assembly 12 are configured such that the profile depth a of the low profile panel assembly 10 has a maximum profile depth a of 25 mm. In another example, the panel assembly 10 is configured such that the profile depth a of the "low profile panel assembly" 10 is between 16 mm and 25 mm. In another example, the panel assembly 10 is configured such that the profile depth a of the low profile panel assembly 10 does not exceed 16 mm. Limiting the profile depth a as described herein optimizes the storage volume of the compartment 62, which may be defined by the compartment depth b.

FIGS. 1 and 2 show the panel assembly 10 configured as a load bearing floor panel including a reinforcing assembly 12 positioned in the panel assembly 10 such that in an installed position in the vehicle 60, the reinforcing assembly 12 is laterally oriented cross-vehicle, e.g., is perpendicular to the longitudinal fore-to-aft or x-axis of the vehicle, where the longitudinal or x-axis is understood to be the axis of the vehicle extending from the front of the vehicle to the rear of the vehicle, and the lateral or y-axis of the vehicle extends from one side of the vehicle such as the driver side to the opposing side (the passenger side) of the vehicle. The reinforcing assembly 12 and reinforcing rib 38 may be configured to substantially traverse the panel assembly 10, e.g., to extend from one edge to an opposing edge of the panel assembly 10, and may be centrally located within the panel assembly 10, e.g., substantially parallel and proximate to the lateral axis of the panel assembly 10, as shown in the illustrative example of FIGS. 1-2. The reinforcing rib 38 may be configured to enclose the reinforcing assembly 12 within the panel assembly 10, such that the reinforcing assembly 12 is protected from exposure to the environment, which may include protecting the reinforcing assembly 12 from potentially corrosive contaminants, thereby minimizing or eliminating the need for application of any protective coating to or anti-corrosive treatment of the reinforcing assembly 12 prior to assembly in the panel assembly 10.

The example shown in FIGS. 1-2 is not intended to be limiting, and it would be understood that other configurations of the panel assembly 10 and the reinforcing assembly 12 are possible. For example, the reinforcing assembly 12 may be positioned substantially parallel to the longitudinal axis of the panel assembly 10, may be centrally located or proximate a portion of the perimeter of the panel assembly 10. The reinforcing assembly 12 may be configured to traverse a portion of the panel assembly 10, e.g., the reinforcing assembly 12 may not extend fully from one perimeter edge to another perimeter edge of the panel assembly 10. The panel assembly 10 may include a plurality of reinforcing assemblies 12, which may be of any arrangement to provide the bending resistance and load strength required of the panel assembly 10 in use. For example, the panel assembly 10 may include a plurality of reinforcing assemblies 12 (not shown) arranged peripherally relative to and/or adjacent to the compartment interface 64 of the panel assembly 10. The plurality of reinforcing assemblies 12 (not shown) may be arranged parallel or skewed relative to each other to be non-bisecting. The panel assembly 10 may include a plurality of reinforcing assemblies 12 in an intersecting or bisecting arrangement (not shown), which may be one of a grid-pattern, an X-formation, a parallelogram, a triangle, or other polygon, by way of non-limiting example, and may bisect each other in an orthogonal or non-orthogonal arrangement or combination of these.

FIGS. 4-6 show the reinforcing assembly 12. Referring to FIG. 4, one or more brackets 40 may be operatively attached to the reinforcing assembly 12 and arranged to position the reinforcing assembly 12 relative to the panel assembly 10. The brackets 40, as will be described in further detail, are configured to be slidably attached to the reinforcing assembly 12 for ease of positioning during forming of the panel assembly 10. It would be understood that the number and placement of brackets 40 may vary depending on the length of the reinforcing assembly 12, the positioning of the reinforcing assembly 12 in the panel assembly 10, and the configuration of the panel assembly 10. One or more compressible elements 16 may be operatively attached to the reinforcing assembly 12. As shown in FIGS. 1-4, a compressible element 16 may be applied between each adjacent pair of brackets 40 on the sides of the reinforcing assembly 12 which interface with the outer and inner panels 20, 30. In one example, the compressible element 16 may be configured as an adhesive foam tape which may be adhesively fastened to the reinforcing assembly 12, to facilitate bonding of the outer and inner panels 20, 30 to the reinforcing assembly 12 at bonding interfaces 36 (see FIG. 9), to provide a cushion and/or transitioning material between the outer or inner panels 20, and the reinforcing assembly 12 (see FIG. 9), to stabilize the position of the reinforcing assembly 12 relative to the panel assembly 10, and to substantially prevent any "buzz, squeak, rattle" from originating from the interface of the reinforcing assembly 12 with any of the brackets 40 and outer and inner panels 20, 30 or movement of the reinforcing assembly 12 in use.

Figure 9:
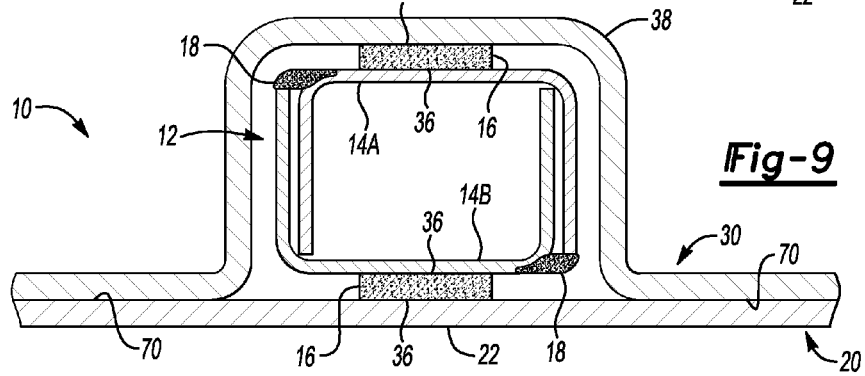
FIG. 9 is a fragmentary cross-sectional view of section 9-9 of a portion of the panel assembly of FIGS. 1 and 2.

The compressible element 16 may be configured as a pressure sensitive adhesive (PSA) tape, which may have a pressure sensitive adhesive, such as an acrylic-based adhesive, applied to opposing sides of the tape such that compressible elements 16 may be placed in adhesive contact and adhered to the reinforcing assembly 12 and to the outer and inner panels 20, 30 at bonding interfaces 36 as shown in FIG. 9. The tape may be formed of polymeric foam, which may be a polyolefin, polyethylene (PE) or ethylene vinyl acetate (EVA) foam, for example. The PSA tape may have a removable release liner to protect the adhesive until the liner is removed. For example, a first side of the compressible element 16 may be adhered to the reinforcing assembly 12 with a release liner covering the non-adhered opposing side. The release liner may remain intact to protect the adhesive until the reinforcing assembly 12 is inserted in the mold forming the panel assembly 10, and the release liner removed prior to positioning the reinforcing assembly 10 in the mold. The compressible element 16 may be configured as a foam insert or strip, which may be, for example, made of open cell foam. An adhesive (not shown) may be applied to the compressible element 16 to bond the compressible element to the reinforcing assembly 12 and/or to the inner and outer panels 20, 30. The compressible element 16 may have adhesive applied to one surface only, such that the compressible element 16 is adhered to the reinforcing assembly 12 and in contact with one or the other of the outer and inner panels 20, 30 as a result of the forming process of the panel assembly 10. The compressible element 16 may be compressed during forming of the panel assembly 10 such that the compressible element 16 in a compressed state exerts a force against the reinforcing assembly 12 and the adjacent panel 20, 30 which inhibits movement of the reinforcing assembly 12 relative to the panels 20, 30, such that the compressible element 16 acts as an anti-rattle component to prevent or substantially minimize any NVH conditions originating from the panel assembly 10.

As shown in FIG. 6, the reinforcing assembly 12 is comprised of a plurality of channel members which are fixedly connected to form the assembly 12. In the example shown, a first channel member 14A and a second channel member 14B are arranged in a nested configuration such that first legs 26A, 26B of the respective channel members 14A, 14B are adjacent to each other, and second legs 28A, 28B of the respective channel members 14A, 14B are adjacent to each other, to form opposing double wall vertical (as shown in FIG. 6) sides of the reinforcing assembly 12, and to form opposing single wall horizontal (as shown in FIG. 6) sides of the reinforcing assembly 12. As shown in FIGS. 5 and 6, the nested channel members are fixedly connected to each other by forming a plurality of welds 18 between the respective end of the outermost leg 26B, 28A of one channel member and the adjacent portion of the respective other channel member 14A, 14B. The adjacent portion of the respective other channel member 14A, 14B generally coincides with the transition or bend 66 between the web 56 and leg portion of the channel member 14A, 14B. The plurality of welds 18 may be formed at intermittently spaced positions along the length of each of the two seam lines formed on opposing corners of the nested channel members 14A, 14B to form the reinforcing assembly 10 having horizontal sides (as oriented in an installed position in the vehicle) of single wall construction, and vertical sides of double wall construction. The welds 18 may be spaced, for example, approximately 7-10 inches from each other along each seam line. In one example, the reinforcing assembly 12 is approximately 38 inches in length and includes welds at each end and spaced at intervals of approximately 9-9.5 inches (weld center to weld center) therebetween over the length of each of the opposing seams.

As shown in FIG. 6, each of the horizontal single wall sides includes a web portion 56 of one of the channel members 14A, 14B, and each of the vertical double wall sides includes a pair of adjacent legs 26A, 26B or 28A, 28B joined by welding. The resulting structure of the reinforcing assembly 12 is resistant to buckling and provides sufficient bending resistance to meet the bending load requirements of the panel assembly 10. The nested construction of the reinforcing assembly 12 provides a assembly 12 having an overall width W which is greater than the height H, such that the reinforcing assembly 12 can be formed with a low profile (H<W) with buckling strength substantially provided by the welded double wall construction. In one example, a "low profile reinforcing assembly" 12 has an overall height to width ratio of less than 0.75 (H≤0.75W), where the height in less than 25 mm in one example, between 16 mm and 25 mm in a second example, and less than 16 mm in a third example. In another example, the overall height to width ratio is less than 0.7 (H≤0.75W), where the channel members 14A, 14B are U-channel members having a gage thickness of 0.047 inches, a leg length (height) of 0.625 inches and a web width of 0.960 inches.

The channel members 14A, 14B may be made of a metallic material. In the example shown, the channel members 14A, 14B are made of a dual phase steel to provide a high strength structure with good bending resistance and high springback, to meet knee loading requirements including maximum loaded and permanent deflection limits. By using dual phase steel, channel members 14A, 14B may be made from lower gage (thinner) material relative to channel members made from other non-dual phase steel materials. The use of lower gage e.g., relatively thinner, channel stock in conjunction with the dual wall construction provides a low-profile reinforcing assembly which enables formation of the panel assembly 10 as a low-profile panel, e.g., one where the profile depth a (see FIG. 3) can be minimized for the panel application. In one example, the channel members 14A, 14B may be made from dual phase 780 (DP780) steel, which may also be designated as DIN EN 10336 or HCT780X, or similar dual phase steel material. The channel members 14A, 14B may be constructed of 18 gage stock have a leg length of approximately 0.75 inches and a web width of approximately 1 inch. In one example, each channel member 14A, 14B is made from DP780 steel having a thickness of 0.047 inches, formed as a U-channel member having a web width of 0.960 inches, a leg length (height) of 0.625 inches and a transition 66 radius therebetween of approximately 0.070 inches. By example, the material used to form channel members 14A, 14B may be characterized by a yield strength of 450-780 MPa, a tensile strength of 780-900 MPa, and an elongation of 14% minimum or preferably greater than 17%. The channel members 14A, 14B may have a protective coating applied, for example, to improve corrosion protection. Example coatings may include hot-dip galvanizing and hot-dip galvanneal treating of the dual phase steel material. Other protective coatings may be used, including organic coatings. The high strength, thin gage, and hollow structure of the reinforcing assembly 12, in combination with the single wall construction of the horizontal sides of the reinforcing assembly 12 provide a low-profile and lightweight assembly for reinforcement of the panel 10. The examples provided here are non-limiting, and other materials may be used to form the channel members 14A, 14B, including high strength steel, aluminum, and other metals.

Figure 7A:
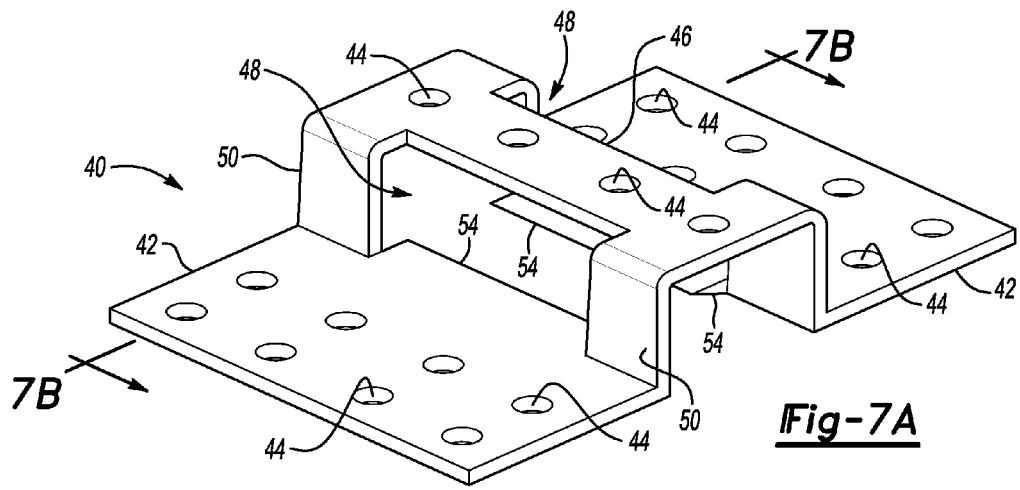
FIG. 7A is a schematic perspective view of the bracket of FIG. 4.
Figure 7B:
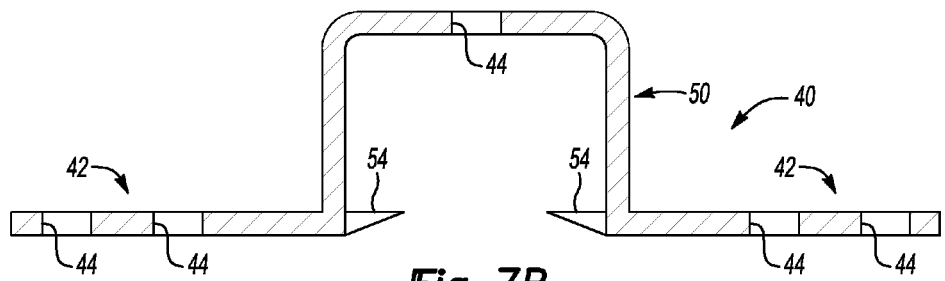
FIG. 7B is a cross-sectional view of section 7B-7B of the bracket of FIG. 7A.

As shown in FIGS. 1-3, the reinforcing assembly 12 is positioned in the panel assembly 10 using a plurality of brackets 40. During the process of forming the panel assembly 10, each bracket 40 is operatively attached to the outer and inner panels 20, 30 to retain the reinforcing assembly 12 relative to the inner and outer panels 20, 30 in an anti-rattle configuration, thereby preventing or substantially eliminating BSR or NVH generating conditions. The number and spacing of the brackets 40 used to position the reinforcing assembly 12 may vary depending on the length of the reinforcing assembly 12, the positioning of the reinforcing assembly 12 in the panel assembly 10, and the configuration of the panel assembly 10 such that one or more brackets 40 may be used to position a reinforcing assembly 12. An example bracket 40 is shown in additional detail in FIGS. 7A and 7B, and in assembled position relative to the panel assembly 10 in FIGS. 8 and 9. As shown in FIGS. 7A, 7B, the bracket 40 includes a pair of flanges 42, each flange extending from opposing sides of strap portions 50. The straps 50 are joined by a bridge portion (bridge) 46 to form the body of the bracket 40. An opening 48 is defined by the straps 50, bridge 46 and each flange 42, to provide a lightweight bracket 40. The bracket 40 is made of a polymer-based material, such that the bracket 40 may be formed by molding and of a bendable configuration for ease of assembly onto the reinforcing assembly 10. The polymer-based material may be characterized by bonding compatibility with at least one of the outer and inner panels 20, 30. By way of example, the bracket 40 may be made from a polypropylene (PP) material, which may include recycled PP.

Figure 8:
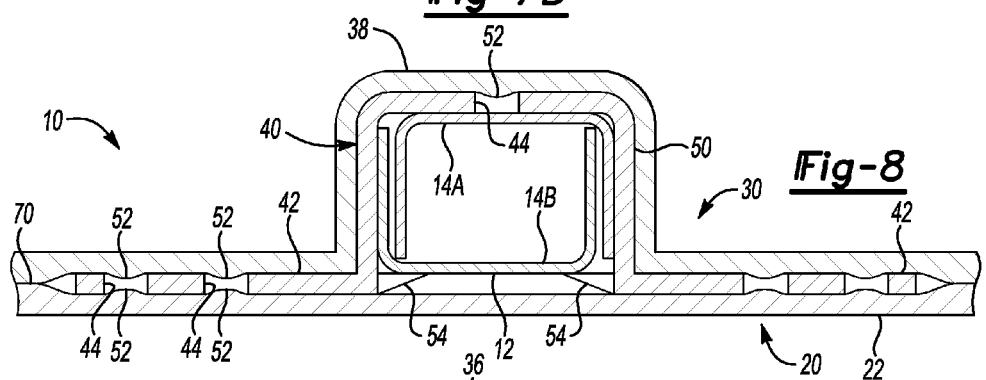
FIG. 8 is a fragmentary cross-sectional view of section 8-8 of a portion of the panel assembly of FIGS. 1 and 2.

Each flange 42 of the bracket 40 defines a tang portion or tang 54 which extends centrally through the opening 48, as shown in FIGS. 7A, 7B, and is configured to conform to the reinforcing assembly 12 to retain the reinforcing assembly 12 in the bracket 40, as shown in FIG. 8. The bracket 40 is configured to be in slidable contact with the reinforcing assembly 12, e.g., the straps 50, bridge 46 and tangs 54 cooperate to provide a sliding interface with the reinforcing assembly 12 while retaining the reinforcing assembly 12 in the bracket 40. The straps 50, bridge 46 and tangs 54 are configured such that the bracket 40 may exert a compressive force on the reinforcing assembly 12 to retain the reinforcing assembly 12 in position in a non-rattling configuration, e.g., in an assembled position in the panel assembly 10, the bracket 40 is maintained in close contact with the reinforcing assembly 12 such that the reinforcing assembly 12 is prevented from rattling, twisting, squeaking, vibrating or otherwise generating a "buzz, squeak, rattle" (BSR) or "noise, vibration and harshness" (NVH) condition.

During forming of the panel assembly 10, the bracket 40 is sandwiched between the outer and inner panels 20, 30, such that during molding the bracket 40 becomes bonded to the outer and inner panels 20, 30. As described previously, the bracket 40 and outer and inner panels 20, 30 may each include a polypropylene based material, to provide bonding compatibility between the bracket 40 and panels 20, 30. The bracket 40 may include a plurality of openings or apertures 44 defined by the flanges 42 and bridge 46. As shown in FIG. 8, during the process of forming the panel assembly 10, for example, during compression molding of the panel assembly 10, material from the outer and inner panels 20, 30 flows into each of the apertures 44 such that the flowed material forms a projection 52 in each aperture 44 to connect the bracket 40 with the respective outer or inner panel 20, 30 from which the material has flowed. The projection 52 contacts the aperture 44 and extends or bulges into the aperture 44 to retain the bracket 40 in position relative to outer and inner panels 20, 30, e.g., relative to the panel assembly 10, thereby defining an anti-rattling feature by preventing movement of the bracket 40 and the reinforcing assembly 12 relative to the inner and outer panels 20, 30, and preventing "buzz, squeak, rattle" (BSR) and "noise, vibration and harshness" (NVH) conditions from originating in the panel assembly 10, and increasing the strength of the bond between the bracket 40 and the outer and inner panels 20, 30.

The panel assembly 10 may be formed, by way of non-limiting example, using a thermoforming process which may include vacuum forming, blow molding and/or compression molding. For example, the panel assembly 10 may be formed by providing a first preheated sheet of material, e.g., a raw board, of the type used to form the inner panel 30, to a mold (not shown) configured to define the profile of the inner panel 30. The mold may be preheated. The mold is configured in a press or similar equipment (not shown) such that a vacuum may be applied to the mold to at least partially form the profile of the inner panel 30 and at least partially define a reinforcing rib 38 in the inner panel 30. The reinforcing bar 12 including attached compressible elements 16 and slidably attached brackets 40 is inserted into the reinforcing rib 38 portion of the inner panel 30, now formed in the mold. Prior to inserting the reinforcing bar 12 into the mold, adhesive surfaces of the compressible elements 16 may be exposed, for example, by removal of a protective release liner, such that the compressible elements 16 may be adhered to the panels 20, 30 during the molding process. If required, the position of the brackets 40 may be adjusted to position the reinforcing assembly 12 and/or brackets 40 relative to the inner panel 30 and/or the mold.

A second preheated sheet of material of the type used to form the outer panel 20 is provided to the mold, and the mold is activated to blow form the outer panel 20. An appearance layer 22, which may be a carpet material, textile, or other insert, as described previous, may be provided to the mold and applied or placed in contact with the outer panel 20, for bonding to the outer panel during a compression molding cycle. The mold is closed and a compression molding cycle is activated. The mold may include a trim feature such that the first and second sheets are trimmed by closure of the mold to define the compartment interface 64 of the panel assembly 10. During the compression molding cycle, which may include a cure and/or cooling cycle, the brackets 40 are bonded to the outer and inner panels 20, 30, and material from the outer and inner panels 20, 30 flows into the apertures 44 to form the projections 52, to retain the reinforcing assembly 12 in position relative to the outer and inner panels 20, 30. The outer and inner panels 20, 30 are bonded to each other during the compression cycle to form bonded interfaces 70 (see FIGS. 3, 8, 9) to adhere the outer panel 20 to the inner panel 30, thereby forming the panel assembly 10. The panel assembly 10 is removed from the mold. The formed panel assembly 10 may be further processed. For example, trim components, such as fasteners, latches, straps, clips, handles, d-rings, etc. may be attached or applied to the panel assembly 10.

The examples shown in FIGS. 1-9 are intended to be non-limiting, and it would be understood that additional configurations of the load bearing panel 10 described herein are possible. For example, the panel assembly 10 may be configured for use other than as a floor assembly and may be configured in other than a horizontal orientation to enclose an opening or compartment, which may require a low profile closure as provided by the panel assembly 10.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A panel assembly configured to enclose an opening in a vehicle, the panel assembly comprising:
   a first panel defining a panel surface;
   a second panel;
     wherein the first panel and the second panel are each made of non-metallic material; and
   a reinforcing assembly comprising:
     a first channel member; and a second channel member;
wherein the first and second channel members are attached to each other;
wherein the reinforcing assembly is interposed between the first and second panels;
wherein the first panel is attached directly to the second panel to completely enclose the reinforcing assembly between the first and second panels; and
wherein the panel assembly is characterized by a deflection of less than 15 millimeters in a load direction when subjected to a point load of 225 pounds applied centrally to the panel surface in the load direction with the panel assembly enclosing the opening;
wherein the vehicle includes a floor defining the opening;
wherein the panel assembly is configured to enclose the opening; and
wherein the panel surface is flush with the floor when the panel assembly is enclosing the opening.

2. The panel assembly of claim 1, wherein the profile depth of the panel assembly does not exceed 25 mm.

3. The panel assembly of claim 1, further comprising:
at least one bracket interposed between the first and second panels and configured to position the reinforcing assembly relative to the panel assembly.

4. The panel assembly of claim 3, wherein the bracket includes at least one anti-rattling feature.

5. The panel assembly of claim 3, wherein:
the bracket defines an aperture; and
at least one of the first and second panels projects into the aperture to operatively attach the bracket and the at least one of the first and second panels.

6. The panel assembly of claim 1, further comprising a compressible element interposed between the reinforcing assembly and one of the first and second panels.

7. The panel assembly of claim 6, wherein the compressible element is configured as an adhesive foam tape.

8. The panel assembly of claim 1, further comprising:
a second reinforcing assembly including first and second channel members fixedly attached to each other; and
wherein the second reinforcing assembly is interposed between the first and second panels.

9. A load bearing panel assembly configured to enclose an opening in a vehicle, the panel assembly comprising:
a first panel;
a second panel;
an appearance surface defined by one of the first and second panels;
a reinforcing assembly including a pair of channel members, each channel member including a first leg and a second leg;
wherein the pair of channel members are arranged such that the first legs of the pair of channel members are adjacent one another and the second legs of the pair of channel members are adjacent one another; and
at least one bracket at least partially surrounding the reinforcing assembly;
wherein the reinforcing assembly and the at least one bracket are interposed between the first and second panels;
wherein the first panel is attached directly to the second panel to completely enclose the reinforcing assembly and the at least one bracket between the first and second panels;
wherein the vehicle includes a floor defining an opening;
wherein the panel assembly is configured to enclose the opening; and
wherein the appearance surface is flush with the floor when the panel assembly is enclosing the opening.

10. The load bearing panel assembly of claim 9, wherein the panel assembly is characterized by a deflection of less than 15 millimeters in a load direction of a knee load of 225 pounds applied centrally to the appearance surface in the load direction.

11. The load bearing panel assembly of claim 9, wherein the reinforcing assembly is made of dual phase steel.

12. The load bearing panel assembly of claim 9, wherein the reinforcing assembly is characterized by a height to width ratio of less than 0.75.

13. The load bearing panel assembly of claim 9, further comprising a component operatively attached to the reinforcing assembly, wherein the component defines an anti-rattle feature.

14. A panel assembly configured to enclose an opening, the panel assembly comprising:
a first panel;
a second panel; and
a reinforcing assembly comprising:
a first channel member; and
a second channel member;
wherein the first and second channel members are attached to each other;
a bracket comprising:
opposing first and second flanges; and
a first strap disposed between and connecting the first and second flanges;
wherein the first strap defines an opening to receive the reinforcing assembly such that the first strap surrounds the reinforcing assembly;
a tang portion defined by at least one of the first and second flanges;
wherein the tang portion extends into the opening and is in contact with the reinforcing assembly to retain the reinforcing assembly in the opening;
wherein the reinforcing assembly and the at least one bracket are interposed between the first and second panels; and
wherein the first panel is attached directly to the second panel to completely enclose the reinforcing assembly and the at least one bracket between the first and second panels.

15. The panel assembly of claim 14, further comprising:
a sliding interface between the bracket and the reinforcing assembly.

16. The panel assembly of claim 14, wherein the bracket further comprises:
a second strap disposed between and connecting the first and second flanges;
wherein the second strap further defines the opening to receive the reinforcing assembly such that the second strap surrounds the reinforcing assembly.

17. The panel assembly of claim 3, wherein the at least one bracket comprises:
opposing first and second flanges; and
a first strap disposed between and connecting the first and second flanges;
wherein the first strap defines an opening to receive the reinforcing assembly such that the first strap surrounds the reinforcing assembly.

18. The panel assembly of claim 14, wherein the panel assembly is configured as a load bearing panel assembly.

* * * * *